US009674847B2

United States Patent
Phuyal et al.

(10) Patent No.: US 9,674,847 B2
(45) Date of Patent: Jun. 6, 2017

(54) DEVICE TO-DEVICE COMMUNICATION

(71) Applicant: Intel Corporation, Santa Clara, CA (US)

(72) Inventors: Umesh Phuyal, Beaverton, OR (US); Youn Hyoung Heo, San Jose, CA (US); Hyung-Nam Choi, Hamburg (DE); Hong He, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 67 days.

(21) Appl. No.: 14/440,429

(22) PCT Filed: Dec. 3, 2013

(86) PCT No.: PCT/US2013/072890
§ 371 (c)(1),
(2) Date: May 4, 2015

(87) PCT Pub. No.: WO2014/089093
PCT Pub. Date: Jun. 12, 2014

(65) Prior Publication Data
US 2015/0289282 A1 Oct. 8, 2015

Related U.S. Application Data

(60) Provisional application No. 61/734,323, filed on Dec. 6, 2012.

(51) Int. Cl.
H04W 72/08 (2009.01)
H04B 3/23 (2006.01)
(Continued)

(52) U.S. Cl.
CPC .......... *H04W 72/085* (2013.01); *H04B 3/232* (2013.01); *H04B 7/015* (2013.01);
(Continued)

(58) Field of Classification Search
None
See application file for complete search history.

(56) References Cited

U.S. PATENT DOCUMENTS 8,565,064 B2 * 10/2013 Tang .................... H04B 7/0417
370/208
2009/0047955 A1 * 2/2009 Frenger ................ H04J 11/0093
455/436
(Continued)

FOREIGN PATENT DOCUMENTS

WO WO2011085817 A1 7/2011
WO WO2011109941 A1 9/2011

OTHER PUBLICATIONS

Lee, Jungha et al., "A session setup mechanism based on selective scannign for device-to-device communication in cellular networks", 2011 17th Asia-Pacific Conference on Communications, Oct. 2-5, 2011, Malaysia, p. 677-681.*
(Continued)

*Primary Examiner* — Faruk Hamza
*Assistant Examiner* — Cassandra Decker
(74) *Attorney, Agent, or Firm* — Schwabe, Williamson & Wyatt, P.C.

(57) ABSTRACT

An apparatus is provided for a device-to-device, D2D, communication enabled user equipment, UE, comprising a processing section to determine, based on a signal received from another UE, a channel condition between the UE and the another UE; the UE to report the determined channel condition to an evolved Node B, eNB. The processing section is to initiate D2D communication based on a communication from the eNB, received in response to the report. Also, an apparatus is provided for a network element, comprising An input to receive a describing a channel condition between a first UE and a second UE; a processor to determine, based on the channel condition, whether or not D2D communication between the first UE and the second UE is to be enabled; and an output to output a result of the determination when the processor determines D2D communication is to be enabled. Related methods are also provided.

23 Claims, 14 Drawing Sheets

(51) Int. Cl.
| | |
|---|---|
| *H04L 25/00* | (2006.01) |
| *H04W 8/00* | (2009.01) |
| *H04L 5/00* | (2006.01) |
| *H04W 76/04* | (2009.01) |
| *H04W 76/02* | (2009.01) |
| *H04W 72/04* | (2009.01) |
| *H04L 5/14* | (2006.01) |
| *H04B 7/015* | (2006.01) |
| *H04L 29/08* | (2006.01) |
| *H04W 48/08* | (2009.01) |
| *H04W 56/00* | (2009.01) |

(52) U.S. Cl.
CPC .............. *H04L 5/0048* (2013.01); *H04L 5/14* (2013.01); *H04L 25/00* (2013.01); *H04L 67/1068* (2013.01); *H04W 8/005* (2013.01); *H04W 48/08* (2013.01); *H04W 56/00* (2013.01); *H04W 72/0413* (2013.01); *H04W 72/082* (2013.01); *H04W 76/023* (2013.01); *H04W 76/046* (2013.01)

(56) References Cited

U.S. PATENT DOCUMENTS

| | | | |
|---|---|---|---|
| 2010/0009675 A1* | 1/2010 | Wijting | H04W 72/02 455/426.1 |
| 2010/0261469 A1* | 10/2010 | Ribeiro | H04W 99/00 455/423 |
| 2010/0271952 A1* | 10/2010 | Nickisch | H04W 36/0088 370/241 |
| 2011/0098043 A1* | 4/2011 | Yu | H04W 60/00 455/435.1 |
| 2011/0222424 A1 | 9/2011 | Abhishek et al. | |
| 2011/0258327 A1* | 10/2011 | Phan | H04W 16/10 709/227 |
| 2011/0268006 A1 | 11/2011 | Koskela et al. | |
| 2011/0275382 A1* | 11/2011 | Hakola | H04W 24/10 455/452.2 |
| 2012/0083283 A1* | 4/2012 | Phan | H04W 72/048 455/450 |
| 2012/0093098 A1 | 4/2012 | Charbit et al. | |
| 2013/0005377 A1* | 1/2013 | Wang | H04W 72/0406 455/509 |
| 2013/0012221 A1* | 1/2013 | Zou | H04W 72/10 455/452.1 |
| 2013/0294427 A1* | 11/2013 | Kim | H04W 16/14 370/338 |
| 2014/0010108 A1* | 1/2014 | Tavildar | H04W 8/005 370/254 |
| 2016/0277945 A1 | 9/2016 | Bienas et al. | |

OTHER PUBLICATIONS

International Search Report and Written Opinion mailed Mar. 21, 2014 from International Application No. PCT/US2013/072890.

* cited by examiner

| Information element/ Group name | Need | Multi | Type and reference | Semantics description | Version |
|---|---|---|---|---|---|
| D2D CMRS quality measured results list | OP | 1 to <maxNum D2D neighbours> | | maxNumD2Dneighbours is the maximum number of D2D neighbours for which a UE reports channel conditions. It may be predefined or signalled by eNB | |
| > Measured Neighbour UEs | | | | | |
| >> UE ID | | | Sequence of digits | UE ID can be IMSI or other unique identity. Alternatively, it can be the resource index of CMRS. | |
| >> CMRS received power | | | Integer (0..97) | CMRS [dBm] according to a predefined quantization | |

Fig. 5

| Reported value | Measured quantity value | Unit |
|---|---|---|
| CMRS_00 | CMRS < -140 | dBm |
| CMRS_01 | -140 ≤ CMRS < -139 | dBm |
| CMRS_02 | -139 ≤ CMRS < -138 | dBm |
| ... | ... | ... |
| CMRS_95 | -46 ≤ CMRS < -45 | dBm |
| CMRS_96 | -45 ≤ CMRS < -44 | dBm |
| CMRS_97 | -44 ≤ CMRS | dBm |

*MeasResults* information element

```
-- ASN1START

MeasResults ::=        SEQUENCE {
    measId                 MeasId,
    measResultPCell        SEQUENCE {
        rsrpResult             RSRP-Range,
        rsrqResult             RSRQ-Range
    },
    measResultNeighCells   CHOICE {
        measResultListEUTRA    MeasResultListEUTRA,
        measResultListUTRA     MeasResultListUTRA,
        measResultListGERAN    MeasResultListGERAN,
        measResultsCDMA2000    MeasResultsCDMA2000,
        ...
    }                                                  OPTIONAL,
    ...,
    [[ measResultForECID-r9 MeasResultForECID-r9 OPTIONAL
    ]],
    [[ locationInfo-r10   LocationInfo-r10    OPTIONAL,
       measResultServFreqList-r10 MeasResultServFreqList-r10   OPTIONAL
    ]],
    [[                                                              ─ 1110
    ┌─────────────────────────────────────────────────────────────────┐
    │ -- D2D data transfer volume                                      │
    │ d2d-TrafficVolumeMeasResultsList   D2D-TrafficVolumeMeasResultsList │
    │ OPTIONAL                                                         │
    └─────────────────────────────────────────────────────────────────┘
    ]]                                                               ─ 1120
}
┌─────────────────────────────────────────────────────────────────┐
│ D2D-TrafficVolumeMeasResultsList ::= SEQUENCE ( SIZE            │
│ (1..maxNumOf-D2D-UEs) ) OF D2D-TrafficVolumeMeasResults         │
│                                                                  │
│ D2D-TrafficVolumeMeasResults ::= SEQUENCE {                     │
│     d2d-UE-Identity    D2D-UE-Identity,                         │
│     d2d-dataSent       INTEGER (0..4294967295)    OPTIONAL,     │
│     d2d-dataReceived   INTEGER (0..4294967295)    OPTIONAL      │
│ }                                                                │
│                                                                  │
│ D2D-UE-Identity ::= CHOICE {                                    │
│     imsi         IMSI,                                          │
│     s-TMSI       S-TMSI,                                        │
│     ...                                                          │
│ }                                                                │
└─────────────────────────────────────────────────────────────────┘
-- ASN1STOP
```

Fig. 11

DEVICE TO-DEVICE COMMUNICATION

CROSS REFERENCE TO RELATED APPLICATIONS

The present application is a national phase entry under 35 U.S.C. §371 of International Application No. PCT/US2013/072890, filed Dec. 3, 2013, entitled "DEVICE-TO-DEVICE COMMUNICATION", which designates the United States of America, which claims priority to U.S. Patent Application No. 61/734,323, filed Dec. 6, 2012, entitled "ADVANCED WIRELESS COMMUNICATION SYSTEMS AND TECHNIQUES." The entire disclosures of which are hereby incorporated by reference in their entireties for all purposes, except for those sections, if any, that are inconsistent with this specification.

BACKGROUND OF THE INVENTION

It is becoming more important to be able to provide telecommunication services to fixed and mobile subscribers as efficient and inexpensively as possible. Further, the increased use of mobile applications has resulted in much focus on developing wireless systems capable of delivering large amounts of data at high speed.

Development of more efficiently and higher bandwidth wireless networks has become increasingly important and addressing issues of how to maximize efficiencies in such networks is ongoing.

Proximity-based applications and services represent a fast growing social and technological trend that may have a major impact on the evolution of cellular wireless/mobile broadband technologies. These services are based on the awareness that two devices or two users are close to each other and, thus, may be able to directly communicate with each other in a device-to-device (D2D) configuration (also known as LTE Direct). Proximity-based applications include social networking, mobile commerce, advertisement, gaming, etc. D2D communication may also be important to public safety first responders, who may be able to use D2D to communicate without overloading a base station or evolved Node B (eNB, also referred to as eNodeB or E-UTRAN Node B). In addition, the use of D2D communication can result in offloading some traffic from a cellular network.

BRIEF DESCRIPTION OF THE DRAWINGS

Aspects, features and advantages of embodiments of the present invention will become apparent from the following description of the invention in reference to the appended drawings in which like numerals denote like elements and in which:

FIG. 5 is a table showing information elements according to various embodiments;

FIG. 11 illustrates an information element according to various embodiments;

DETAILED DESCRIPTION

The description and the drawings illustrate specific embodiments. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims. Specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

As used herein, the terms "module" or "section" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Figure 1:
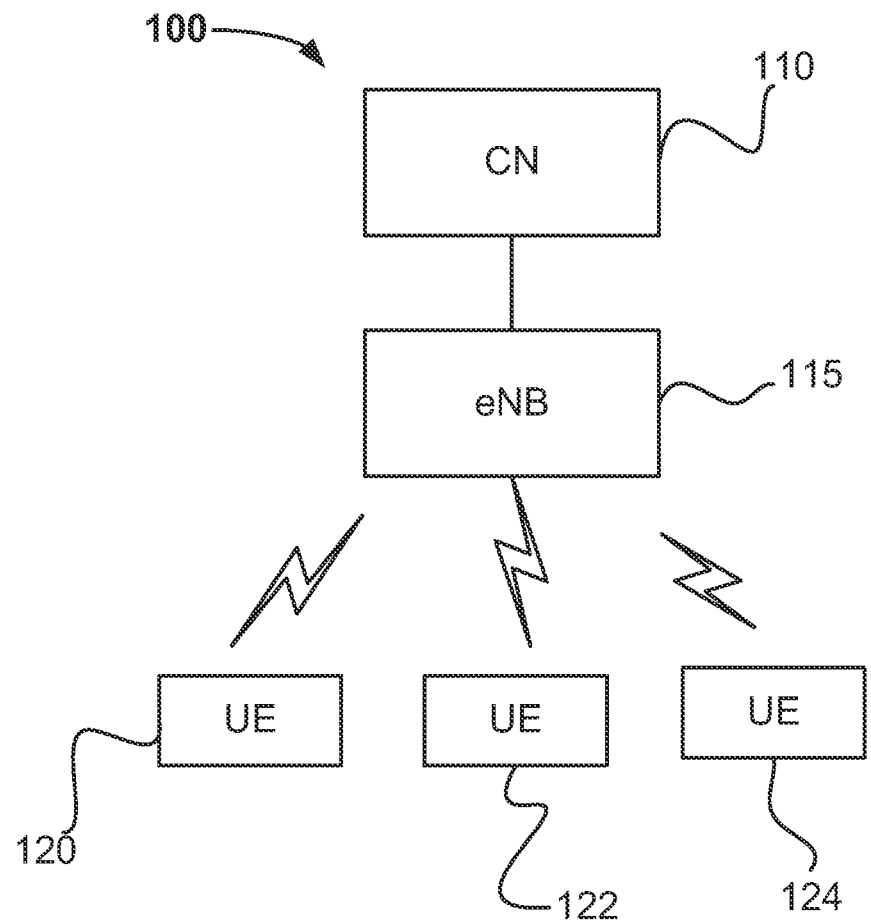
FIG. 1 is block diagram of an example wireless network compatible with various embodiments.

FIG. 1 is a block diagram illustrating a wireless communication network 100 compatible with various embodiments. The wireless communication network 100 may include user equipment (UE) 120-124 and an evolved Node B (eNB) 115. In various embodiments, the eNB 115 may be a fixed station (e.g., a fixed node) or a mobile station/node. eNB 115 is connected to Core network (CN) 110 (also referred to as provider network, PN).

In various embodiments, the UE 120-124 and/or the eNB 115 may include a plurality of antennas to implement a multiple-input-multiple-output (MIMO) transmission system, which may operate in a variety of MIMO modes, including single-user MIMO (SU-MIMO), multi-user MIMO (MU-MIMO), closed loop MIMO, open loop MIMO or variations of smart antenna processing. The UE 120-124 may provide some type of channel state information (CSI) feedback to the eNB 115 via one or more up link channels, and the eNB 115 may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

In various embodiments, the UE 120 may transmit CSI feedback to the eNB 115. The CSI feedback may include information related to channel quality index (CQI), precoding matrix indicator (PMI), and rank indication (RI). PMI may reference, or otherwise uniquely identify, a precoder within the codebook. The eNB 115 may adjust the downlink channel based on the precoder referenced by the PMI.

UEs may be devices such as smart phones, tablets, e-readers, mobile hotspots, and the like. Traditionally, UEs communicate with other devices via the core network. For example, data may travel from a mobile device through an evolved Node B (eNB) before being routed to its eventual destination. However, in some situations it may be advantageous if devices (i.e. UEs) were able to communicate directly with each other, without the use of an eNB and/or the core network.

In an exemplary situation, user equipment, UE0, becomes physically close to user equipment, UE1. A user may wish to transfer files, play a game, or otherwise communicate with UE1 from UE0. The connection between UE0 and UE1 may be automatically initiated by an application, or may be initiated by a user. It may be advantageous, both from the point of view of the underlying network and from the point of view of the devices themselves, for UE0 to communicate directly with UE1. Such a connection has several benefits. For example, less traffic would pass through the eNB, allowing the eNB to service more devices. In addition, because UE0 would be communicating directly with UE1, which is in relative proximity, UE0 and UE1 may be able to use a lower-power mode to make such communications, resulting in power savings and longer battery life. This may also reduce interference from UE0 and UE1 on other nearby UEs and/or eNBs.

Figure 2:
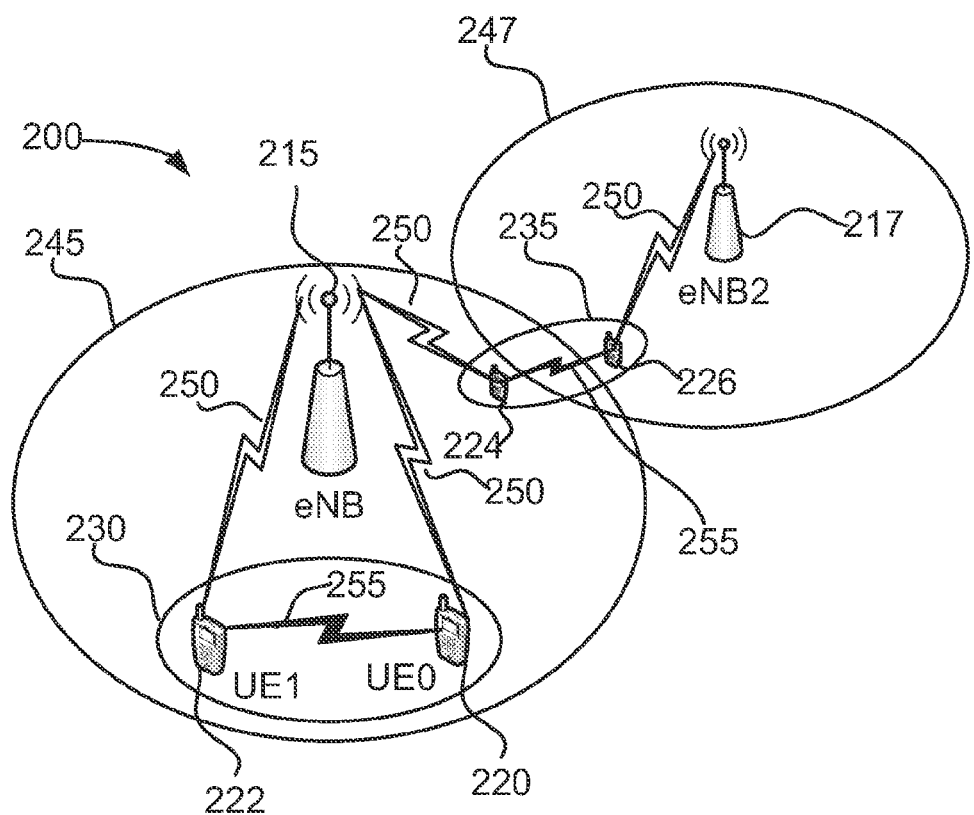
FIG. 2 illustrates a wireless network with device-to-device enabled user equipment according to various embodiments.

FIG. 2 illustrates an exemplary system that combines a Device-to-Device ("D2D") network with a wireless access network, such as an LTE or LTE Advanced network. Mobile broadband network 200 includes an eNB 215. UEs 220, 222 and 224 are within the cell 245 of eNB 215 and communicate with eNB 215 via respective LTE communications channels 250. Also illustrated in FIG. 2 is a further eNB (eNB2) 217, having a cell 247. eNB2 is in communication with UE 226 via communication channel 250.

Figure 3:
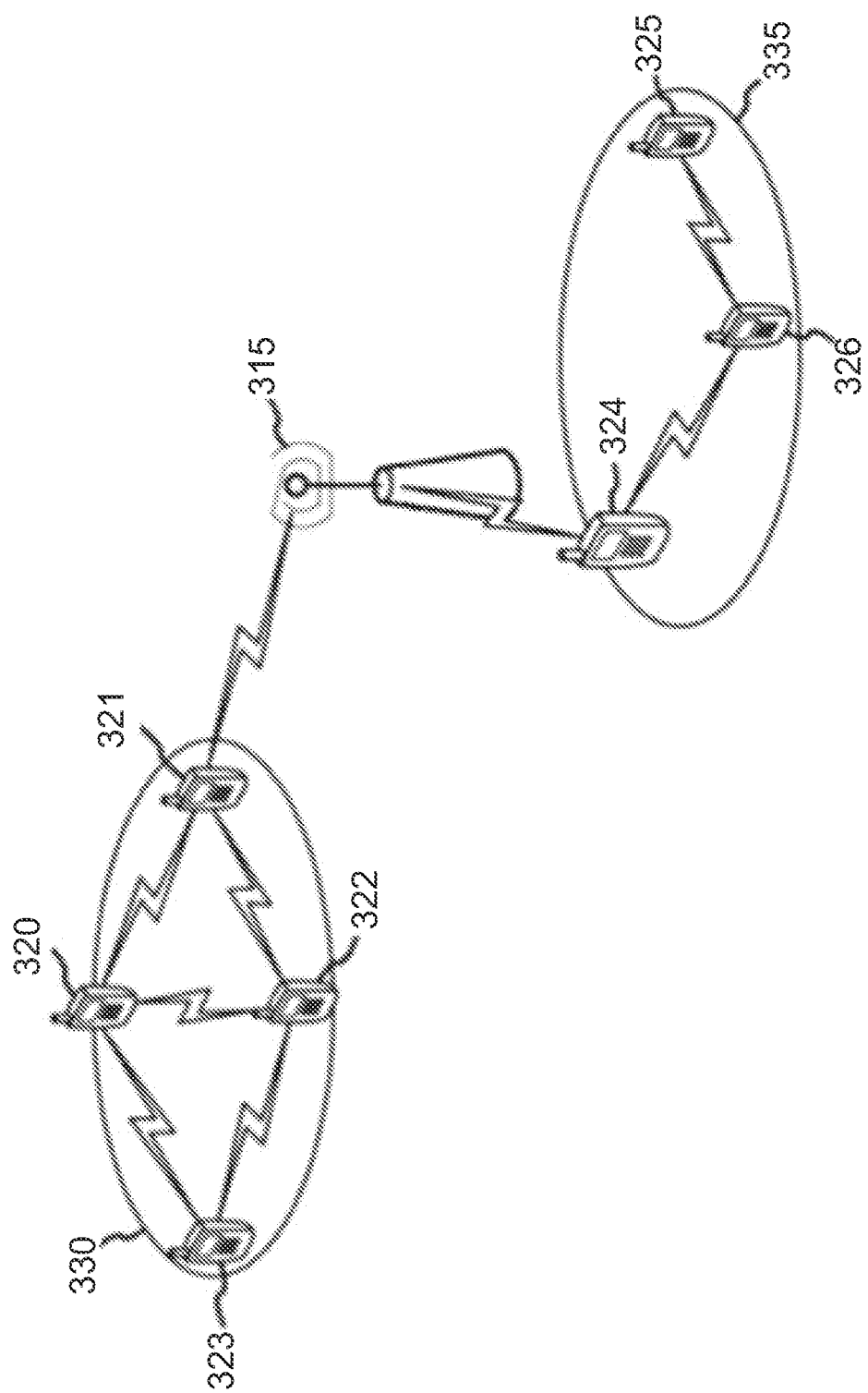
FIG. 3 illustrates a wireless network with device-to-device enabled user equipment according to various embodiments.

FIG. 2 illustrates two D2D clusters 230 and 235. Each one of D2D clusters 230, 235 comprises a plurality of UEs that are capable of communicating directly with each other, without the need to communicate through eNB 215 or eNB2 217. This application may refer to a UE that has D2D capability as a dUE or D2D-UE, to stand for D2D capable User Equipment. As illustrated in cluster 235, the UEs of a cluster may be in communication with different eNBs. Several different layouts of D2D clusters are possible. For example, as illustrated in FIG. 3, a cluster may include more than two UEs. In such clusters, each UE may be in direct communication with one or more than one other UEs in the cluster. Referring to FIG. 3, D2D cluster 330 comprises dUEs 320, 321, 322, and 323 coupled to each other in a mesh configuration, with each of the dUEs 320, 321, 322, and 323 being coupled to each other as illustrated. If a dUE needs to send data to a dUE to which it is not directly coupled (e.g., if dUE 321 is to send data to dUE 323), it can send the data through a dUE to which both of them are connected (e.g., dUE 320). Since the dUEs of cluster 330 are in close proximity to each other, they do not have to transmit data all the way to eNB 315. Accordingly, one or more devices of the cluster may use a lower-power transceiver mode, prolonging the battery life of the dUEs. In addition, because transmissions between the UEs of the cluster are not transmitted via eNB 315, the finite bandwidth capabilities of eNB 315 are not used.

FIG. 3 includes another exemplary cluster 335. Cluster 335 includes UEs 324, 325 and 326. UEs 324 and 325 are D2D connected to each other via UE 326.

In some embodiments, a D2D cluster may include a D2D coordinator. A D2D coordinator is one of the dUEs in the cluster that serves to manage the communications between the dUEs of the cluster and the eNB. In FIG. 3, UE 321 is a D2D coordinator of cluster 330, and UE 324 is a D2D coordinator of cluster 335. In other embodiments, such as that shown in FIG. 2, there is no D2D coordinator, and each UE of a cluster may communicate directly with an eNB. In other embodiments, two or more UEs of a cluster may each communicate directly with an eNB while one or more UEs of the cluster do not communicate directly with an eNB.

It should be understood that other configurations of D2D clusters are also possible. It should also be understood that a single eNB can support many more D2D clusters than are shown in FIGS. 2 and 3.

For the purposes of explanation, the description will focus on a connection between two UEs to be connected via a D2D connection. However, it should be understood that a D2D connection is not limited to two UEs; the principles discussed herein may be extended to support more than two D2D UEs in a D2D communication group (cluster).

Setting up D2D communication may be considered to include two stages: proximity discovery, and subsequent initialization and initiation of the D2D communication. Proximity discovery may be achieved, for example, based on positioning information using e.g., GPS or Assisted-GPS information. The second stage includes allocation of network resources (e.g. bandwidth) to the D2D communication.

Most D2D schemes can be classified as belonging to one of two types, termed normal (commercial) D2D and public safety D2D. Some devices may be arranged to operate according to both schemes, while other devices may be arranged to operate according to only one of these schemes.

According to normal D2D, the D2D-enabled UEs (i.e. UEs that support proximity-based discovery and communication) are able to communicate directly with each-other only within commercial cellular LTE/LTE-Advanced network coverage, i.e. with the help of network elements such as eNBs, mobility management entities (MME), serving gateways (S-GW), etc. This scheme allows the eNB (or other elements of the core network) to exercise control over the network resources that are used during the D2D communication, to minimize interference with nearby devices, for example.

In contrast, public safety D2D is intended to be usable when commercial and/or public safety infrastructure based (cellular) network coverage is not available, e.g. when a network is suffering from outage (due to natural disaster, power outage, network energy saving, incomplete network deployment, etc.). The public safety D2D-enabled UEs (i.e.

UEs that support proximity-based discovery and communication within public safety or both commercial and public safety cellular LTE/LTE-Advanced network coverage) can communicate with each-other even when the infrastructure based network elements are not available to participate in the setup of the D2D communication.

The following lists summarize scenarios in which D2D communication is to be enabled or disabled.

A. Normal (Commercial) D2D
  A1. Enabling D2D for new communication
    Establishing D2D direct path
  A2. Enabling D2D for ongoing communication
    Switching from cellular path to D2D direct path
  A3. Disabling D2D while session is active (for ongoing communication)
    Switching from D2D direct path to cellular path
  A4. Disabling D2D at the end of session
    Ongoing direct communication is completed.
    Network should be made aware of this (e.g. for charging purposes)
    Network should update resource inventory.
B. Public Safety D2D
  B1. Enabling D2D for New Communication
    Establishing D2D direct path with and without network coverage
    Ability of autonomous discovery in absence of network coverage
    Ability of autonomous communication in absence of network coverage
  B2. Enabling D2D for ongoing communication
    Switching from cellular path to D2D direct path with and without network coverage
    Ability of autonomous fail-safe and seamless switching in absence of network coverage
  B3. Disabling D2D while session is active (for ongoing communication)
    Switching from D2D direct path to cellular path within network coverage
    Switching from D2D direct path to cellular path when network is available again after outage
  B4. Disabling D2D at the end of session
    Ongoing direct communication is completed.
    Network should be made aware of this for charging purposes
    Network should update resource inventory
    D2D coordinator, if exists, should be made aware for updating resources inventory
  B5. Enabling/disabling D2D due to route modification/rediscovery
    For public safety D2D supporting multi-hop communication.
    For UE mobility
    Direct switching from D2D to D2D path.

There are similarities between the normal and public safety scenarios, with differences being mainly due to the (possible) lack of network support in public safety scenario (e.g. in the event of network outage). Scenarios B2 and B3 can be applied to transitions between D2D communication and cellular communication due to network failure/recovery.

According to some embodiments, an enabling (admission) decision for normal D2D direct path communication should be made by the network (e.g., by the eNB if both UEs are served by the same eNB, or by MME/S-GW if the UEs belong to different eNBs.)

Figure 4:
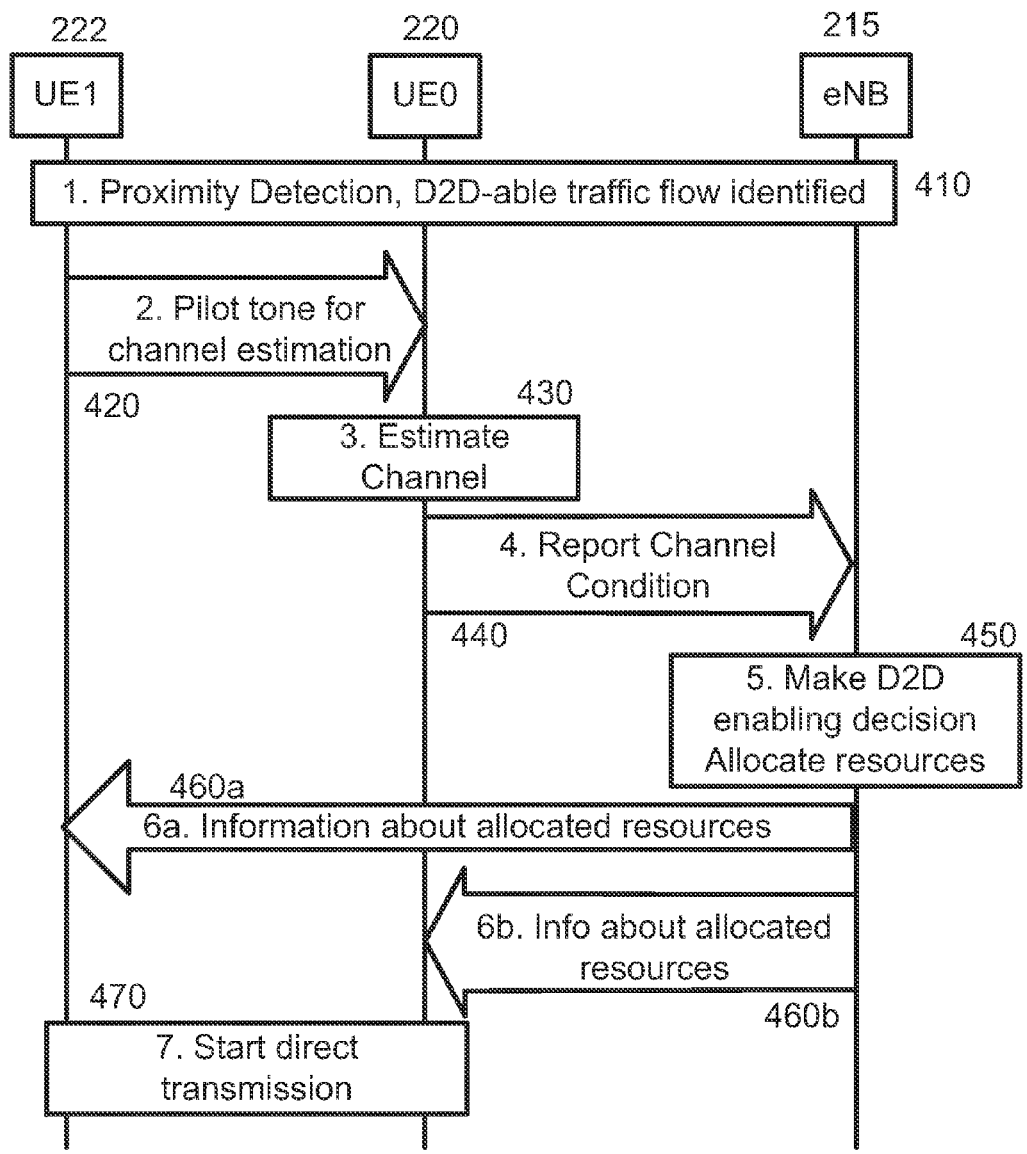
FIG. 4 is a timing diagram showing an example signaling exchange between subscriber stations and a base station according to various embodiments.

FIG. 4 illustrates signal flow, according to some embodiments, for setting up D2D communication between user equipment UE0 220 and UE1 222. Here it is assumed that both UE0 220 and UE1 222 are D2D-enabled, and that UE1 222 attempts to establish a D2D connection (e.g. to carry a phone call) with UE0 220. The roles of UE0 220 and UE1 222 may be reversed, such that UE0 220 attempts to establish a D2D connection with UE1 222, without affecting the following description.

In stage 1 of FIG. 4, denoted 410, proximity detection and identification of D2D-able traffic flow is performed, prior to enabling D2D direct transfer. The eNB 215 or some other network element determines whether the call establishment request by UE1 is a D2D-able traffic flow. Proximity detection relates to determining that two UEs that are to communicate with each other via D2D communication are sufficiently close. More generally, where multi-hop communication is enabled, it may be determined if each of UE0 and UE1 are sufficiently close to at least one respective UE of a cluster. Herein D2D-able traffic is data that is suitable for communication between two or more UE's by D2D communication. For example, communications involving only one UE, such as normal web-browsing, are not typically suitable for D2D communication. D2D-able traffic may include data that is to be transferred from one UE to another, and could include game data (e.g. for multiplayer games accessed by each player via their respective UE), user files (e.g. photos or contact data), message data (e.g. data relating to chat or text messages), voice/video data (e.g. relating to a voice or video telephone call), etc. D2D-able traffic may be one-way traffic (such as a file transfer) or two-way (such as a phone call). An eNB 215 or other network element may determine whether the call establishment request by UE1 222 is a D2D-able traffic flow.

In stage 2, denoted 420, if UE0 220 is found to be within the proximity of UE1 222, UE1 222 sends a Channel Measurement Reference Signal (CMRS) towards UE0 220 for channel estimation purposes. In some examples an existing uplink signal, e.g., Sounding Reference Signal (SRS) may be used as CMRS. In some examples a new, dedicated reference signal may be used. In some examples, D2D-enabled devices are capable of receiving uplink (UL) signals from other UEs in order to support D2D communication. In some examples stage 2 420 may be performed as part of the discovery phase (stage 1 410), e.g. discovery using a pilot signal and/or scanning of other UEs' pilot signals.

In stage 3, denoted 430, UE0 220 estimates the channel conditions between UE1 222 and UE0 220 based on the received CMRS. In some examples this stage may be included in the discovery phase (stage 1 410), e.g., discovery using pilot signal and scanning of other UEs' pilot signals.

In stage 4, denoted 440 in FIG. 4, UE0 reports the channel condition to the eNB. In some embodiments the Uplink Dedicated Control Channel (UL-DCCH) may be used to send the channel condition report. In some embodiments, UE0 can report the received power of CMRS from UE1, for example. In some examples, the UE1 transmit power for CMRS is predefined, and the received power alone can specify the channel condition between UE1 and UE0. CMRS measurement report mapping can be defined similar to Reference Signal Received Power (RSRP). In some embodiments, signal to noise ratio (SNR) or Reference Signal Received Quality (RSRQ) of CMRS can be reported, for example. In some examples, the channel condition may be sent from the UE to the eNB via a D2D coordinator, e.g. 321 or 324 of FIG. 3. A D2D coordinator may also be referred to as a cluster head or group owner.

Reporting the channel condition provides the channel status to eNB which may then use the information on the channel condition to make an enabling decision for D2D communication. In some embodiments, the channel condition information may also be used for making decisions related to physical layer transmission parameters such as Modulation and Coding Scheme (MCS) level, number of Physical Resource Blocks (PRB) etc. for D2D direct communication.

According to some embodiments, the reporting of CMRS measurements may be performed using additional (new, dedicated) information elements (IEs). For example, the additional IEs may be included in the Measurement Information Elements as outlined in FIG. 5. In some embodiments, the additional IEs may be included in the MeasResults IE of the 3GPP LTE-A standards. The MeasResults IE covers measurement results for intra-frequency, inter-frequency and inter-RAT mobility.

Figures 6, 7:
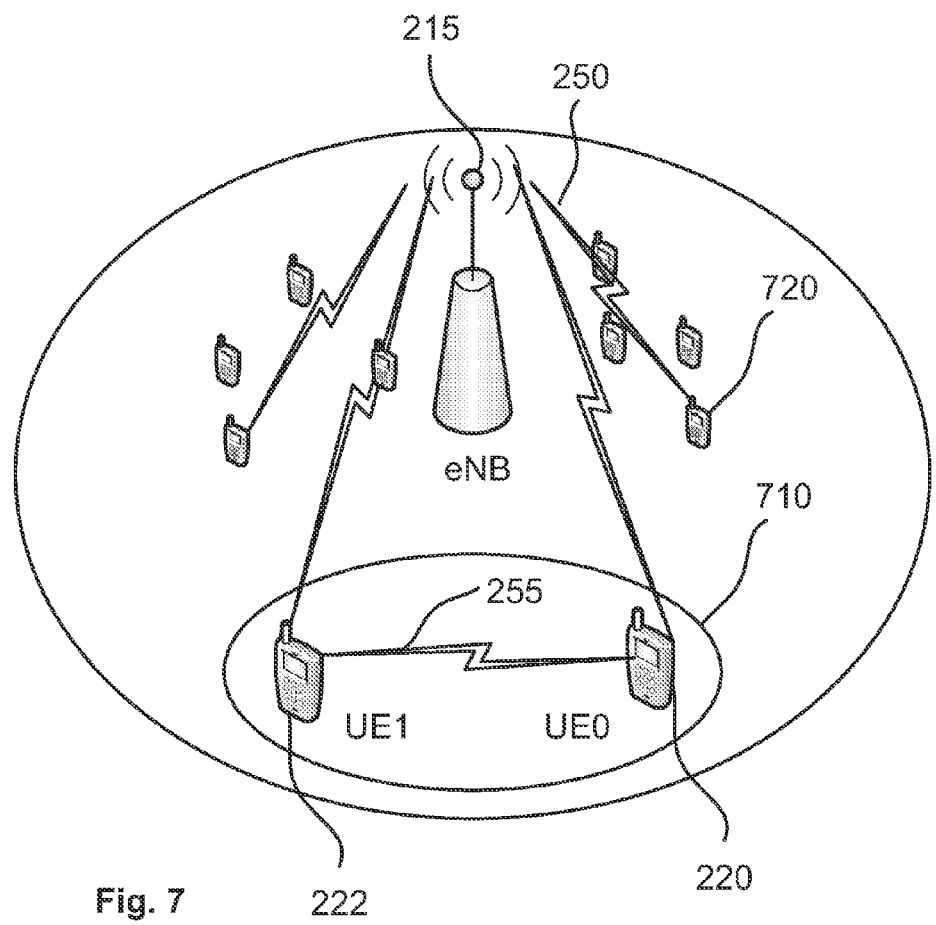
FIG. 6 is a table showing an example of a mapping for CMRS reporting according to various embodiments.
FIG. 7 illustrates a wireless network with device-to-device enabled user equipment according to various embodiments.

In the exemplary IE of FIG. 5, the CMRS received power is reported as a quantized value. This allows reporting to be more efficient, e.g. by reporting an integer rather than the actual measured CMRS received power. For example, the reporting range of CMRS may be defined from −140 dBm to −44 dBm with 1 dB resolution. However, the range and the accuracy of the signaling may be defined differently to the above range and accuracy. An example of the mapping of measured quantity can is shown in FIG. 6.

In stage 5, denoted 450, a network element, such as eNB, or MME/S-GW if more than one eNB are involved, makes a D2D enabling decision based on predefined criteria. For example, in some embodiments the direct link can be enabled if the signal strength of the direct path is above a predefined threshold signal strength (possibly depending on the expected or required Quality of Service, QoS/Quality of Experience, QoE). In some embodiments, the direct link can be enabled if the potential throughput (which can be estimated by estimating signal to noise ratio) is above a predefined potential throughput threshold (possibly depending on the expected or required QoS/QoE).

In some embodiments, the direct link can be enabled based on a loading condition of the network. For example, FIG. 7 schematically illustrates a situation in which the D2D transmission range 710 between UE0 and UE1 is limited such that no or limited interference to other (infrastructure) transmissions (involving other UEs 720 and eNB 215) are introduced, and so the licensed band can be utilized by the D2D pair (UE0 and UE1) even under high load conditions.

In stage 6 460a, 460b, when it has been determined in stage 5 450 that D2D communication is to be enabled, eNB informs the involved UEs that D2D communication has been enabled and provides information about at least one of the channel allocation or resources allocation. In some embodiments, provision of the channel/resources allocation information informs the UEs that D2D communication is to be enabled, and no separate communication is needed. In some embodiments, the D2D enable signal and/or the resource allocation information may use Radio Resource Control (RRC) signaling or dynamic Physical Downlink Control Channel (PDCCH) signaling, for example. As illustrated in FIG. 4, stage 6 includes the eNB providing a D2D enable signal to each UE in the putative D2D cluster. In some embodiments the eNB may provide the D2D enable signal (and possibly information on allocated resources) to only a subset of one or more of the UEs. In some embodiments the eNB may provide the D2D enable signal (and possibly information on allocated resources) to only a subset of one or more of the UEs via the D2D coordinator. The remaining UEs of the cluster may receive a D2D enable signal from the UEs of the subset that received the enable signal and/or from the D2D coordinator.

In stage 7 470, D2D direct path transmission is performed between UE0 and UE1.

According to some embodiments, where, in stage 5 450, it is determined that D2D is not to be enabled, the eNB informs the UEs, and the D2D setup process terminates without initiating D2D communication. In some examples, when D2D is not to be enabled, the eNB does not respond to the UEs, and when a predetermined period of time has passed without receiving a response, the UEs infer that D2D communication is not enabled and terminate setup of D2D communication. The predetermined period of time may begin when the channel condition report is sent, for example by UE0 starting a timer when stage 4 440 has been completed (or at some other predetermined stage before or during stage 4 440).

Where UE0 220 and UE1 222 are associated with different eNBs, they may communicate with the eNB with which they are associated. For example in stage 6, signal 6a may be sent to/received by a first eNB and signal 6b may be sent to/received by a second eNB. The first and second eNBs may communicate this information with each other using other network elements such MME, S-GW or directly using X2 interface.

Figure 8:
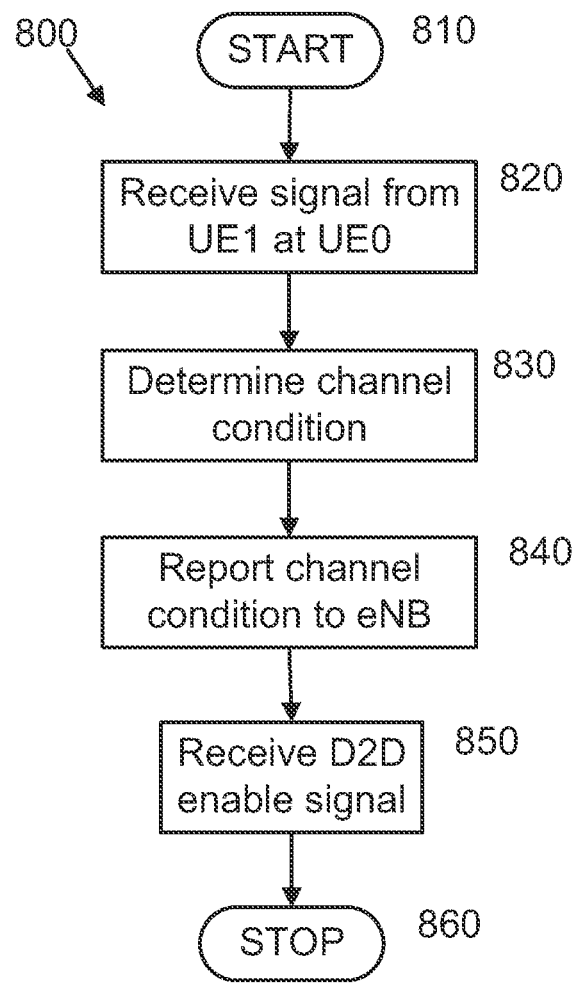
FIG. 8 is a flow-chart illustrating a method performed by a mobile device, according to various embodiments.

According to some embodiments, a UE may perform the method shown in FIG. 8 during the process of setting up D2D communication. For example, the method of FIG. 8 may be performed by UE0 220 of FIG. 4.

In FIG. 8 it is assumed that proximity detection and identification of D2D-able traffic flow (stage 1 of FIG. 4) has been completed prior to the start at the method at 810.

At 820 UE0 220 receives a CMRS signal from UE1 (e.g. as in stage 2 420 of FIG. 4). At 830 UE0 220 determines a condition of the channel between UE0 220 and UE1 222 (e.g. as in stage 3 430 of FIG. 4). At 840 UE0 220 sends a report of the channel condition to eNB 215 (e.g. as in stage 4 440 of FIG. 4). At 850 UE0 220 receives, in response to the channel condition report, a D2D enable signal from eNB 215, informing UE0 220 that D2D communications have been enabled (e.g. as in stage 6 460 of FIG. 4). UE0 220 may receive resource allocation information from eNB 215 as part of, or in addition to, the D2D enable signal. The method of FIG. 8 terminates at 860. Following this, D2D communication between UE0 220 and UE1 222 may then begin.

Figure 9:
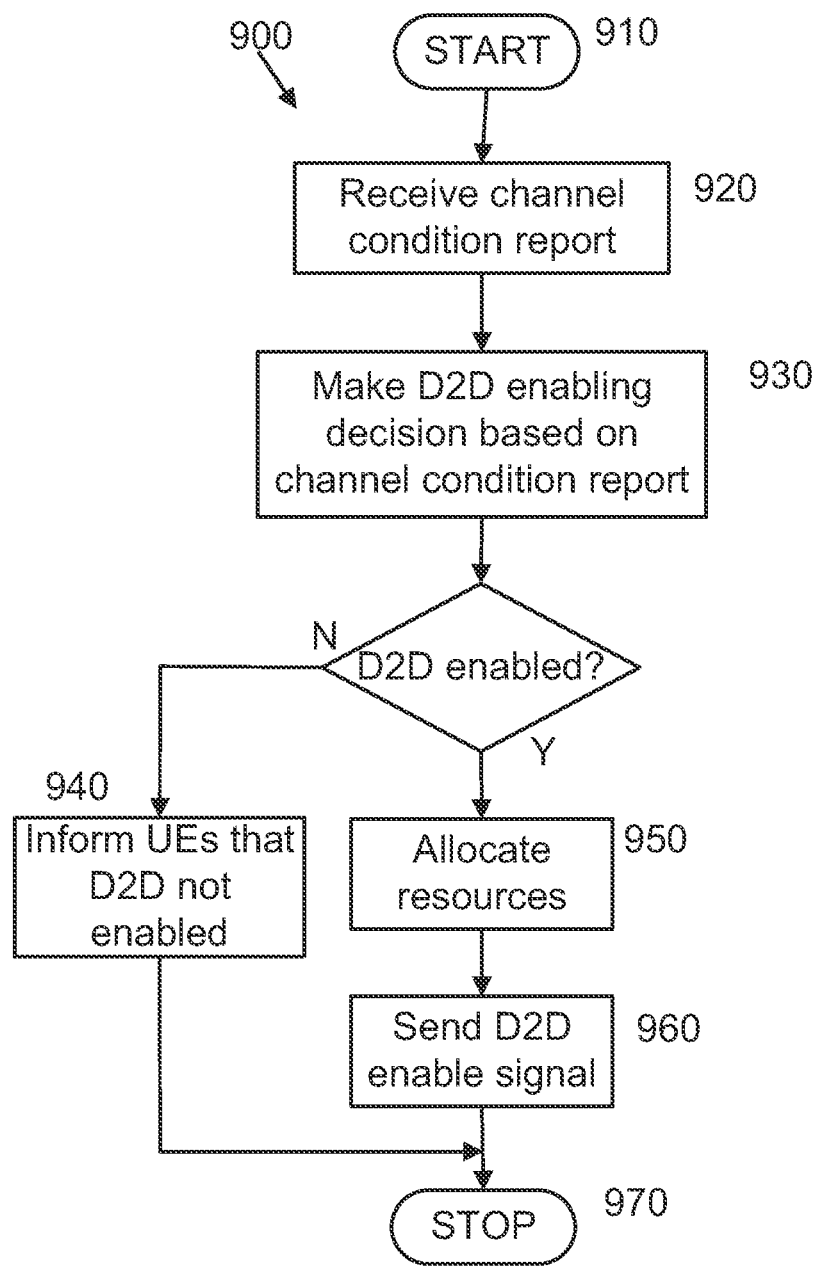
FIG. 9 is a flow-chart illustrating a method performed by a base station, according to various embodiments.

According to some embodiments, an eNB 215 may perform the method 900 shown in FIG. 9 for setting up D2D communication. For example, the method 900 of FIG. 9 may be performed by eNB 215 of FIG. 4. The method 900 begins at 910. At 920 the eNB receives a channel condition report from a UE that is a candidate for D2D communication (e.g. as in stage 4 440 of FIG. 4). At 930 the eNB makes a D2D enabling decision, based at least in part on the received channel report (e.g. as in stage 5 450 of FIG. 4). If, at 930 it is decided that D2D is to be enabled, resources may be allocated at 950, and a D2D enable signal may be sent at 960 (e.g. as in stage 6 460a, 460b of FIG. 4).

Where, at 930, it is decided that D2D is not to be enabled, the eNB 215 informs the UEs accordingly at 940. The setup method performed by the eNB 215 terminates at 970. In some embodiments, the eNB may be configured not to inform the UEs when D2D is not to be enabled. In such embodiments, 940 is omitted, and following the decision not to enable D2D at 930, and the method terminates at 970. In these cases, the UE may infer from the absence of a response from the eNB to the channel condition report that D2D is not to be enabled.

Figure 10:
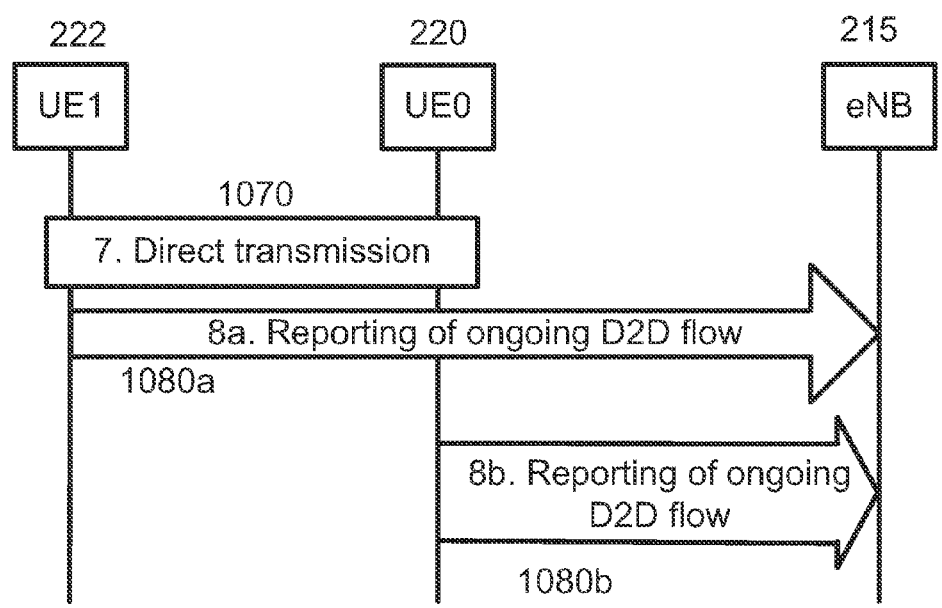
FIG. 10 is a timing diagram showing an example signaling exchange between subscriber stations and a base station according to various embodiments.

FIG. 10 shows a message sequence for data volume reporting according to some embodiments. In FIG. 10 it is assumed that D2D communication has been set-up and is ongoing between UE0 220 and UE1 222. For consistency with FIG. 4, this is labeled as stage 7 1070.

In stage 8, each of the UEs involved in D2D communication reports to the eNB 215 on the ongoing D2D communication. Although not illustrated, the D2D communication 1070 session may be ongoing during and after stage 8 1080. The report may include information on the volume of data transferred between the UEs via a direct D2D link, for example. This arrangement allows the network to keep track of ongoing D2D direct path communication (for normal (commercial) D2D and public safety D2D when using the network). This is beneficial for resource tracking, billing purposes, etc. The reporting of the D2D traffic flow may be event-triggered and/or periodic, for example.

The reporting in stage 8 1080 may be performed using a Measurement Result Information Element. This may be a newly defined (e.g. dedicated) information element.

In some embodiments, an existing reporting method such as traffic volume measurement quantities (e.g., Buffer Occupancy (BO)) for billing purposes, or Buffer Status Reporting (BSR) may be used. In some embodiments, channel quality reporting as described above (in relation to stage 4 440) may be used. In some embodiments, D2D data volume measurement reports may be used, as described below.

FIG. 11 shows an example of RRC signaling to report D2D data volume use, based on the corresponding measurement configuration received from the eNB (not shown here). The measurement configuration may be sent to the UEs by the eNB using downlink RRC messages, and may configure reporting criteria. Reporting criteria may include, for example, whether reporting is to be periodic and/or event-triggered, etc.; the frequency/periodicity of periodic reports; and event-triggering criteria for event-triggered reporting. In the case of periodic reporting, the periodicity may be configured in terms of a number of subframes or a time interval between reports, for example. ReportInterval defined in the 3GPP LTE-A standards may be used for this purpose, avoiding the need to define a new quantity.

For event-triggered reporting, in some embodiments, the UE may trigger the data volume reporting if either transmitted data or received data (or both) is larger than or equal to a data volume threshold. In other embodiments, the UE may trigger the data volume reporting if either transmitted data or received data (or both) is larger than or equal to a data volume threshold and the time since last report is larger than or equal to a time duration threshold. This corresponds to reporting based on exceeding a data volume, but also having a minimum reporting interval. In other embodiments, the UE may trigger the data volume reporting if either transmitted data or received data (or both) is larger than or equal to a data volume threshold or the time since last report is larger than or equal to a time duration threshold. This corresponds to reporting based on exceeding a data volume, but also having a maximum reporting interval. The data volume threshold and time duration threshold can be pre-defined or configured by eNB/network. Combinations of thresholds may be used, for example to provide both a minimum and a maximum reporting interval.

For on-demand reporting, the eNB sends a request to the UE to send a data volume report. The request from the eNB may use higher layer signaling. The request can be sent via RRC signaling to the UE, which may be triggered by NAS or application layer based on various criteria, for example, volume of data to be transferred, QoS/QoE requirement etc.

FIG. 11 shows a specific example of a Measurement Result Information Element, in which the D2D data volume reporting is incorporated into the MeasResults information element. The boxed portions 1110 and 1120 are additions to the MeasResults information element for D2D data volume reporting. D2D data volume reporting for each established D2D communication can be sent periodically, in event-triggered way or based on eNB-request.

The fields introduced in portions 1110 and 1120 are as follows:

D2D-trafficVolumeMeasResultsList
  List of traffic volume measurement results to be reported by a particular D2D-UE. Size of the list is equal to number of UEs connected by D2D communication to the particular UE at the particular time.

numOf-D2D-UEs
  Number of D2D UEs connected (by D2D) to the particular UE that is reporting the data.

D2D-UE-Identity
  Unique identifier of the D2D-UE. For example, this may be an existing unique ID, such as IMSI, or a temporary ID such as S-TMSI. According to some embodiments, a new (e.g. dedicated) format may be used, specifically for D2D UE ID.

D2D-dataSent
  Amount of data sent in bytes by the UE to the UE identified by D2D-UE-Identity field. In some embodiments, this may have a value range from 0 bytes to 4294967295 Bytes.

D2D-dataReceived
  Amount of data received in bytes from the UE to the UE identified by D2D-UE-Identity field. According to some embodiments, this may have values in the range from 0 bytes to 4294967295 Bytes.

maxNumOf-D2D-UEs
  Maximum number of D2D UEs that are permitted to be connected by D2D in a D2D group.

In D2D-dataSent and D2D-dataReceived, the value range corresponds to a reported maximum amount of data sent or received of approximately 4 Gigabytes. This value is advantageous, as it may be represented by four octets. Alternative maximum values may be used.

For simplicity stage 8 1080 is illustrated with both UEs reporting to the same eNB 215, but it is possible for UE0 220 and UE1 222 to be associated with different eNBs, and to send the respective reports to the respective eNB with which they are associated. It is also possible for UE0 220 and/or UE1 222 to be associated with corresponding eNB via a D2D coordinator, and to send the respective reports to the respective eNB via the D2D coordinator.

Embodiments have been described mainly in relation to scenario A1 (establishing normal (commercial) D2D for a new communication). However, features of the embodiments may also be applied to other scenarios listed above. That is, normal D2D scenarios A2 to A4, and public safety scenarios B1 to B5 where the network is available (e.g. not in outage).

Figure 12:
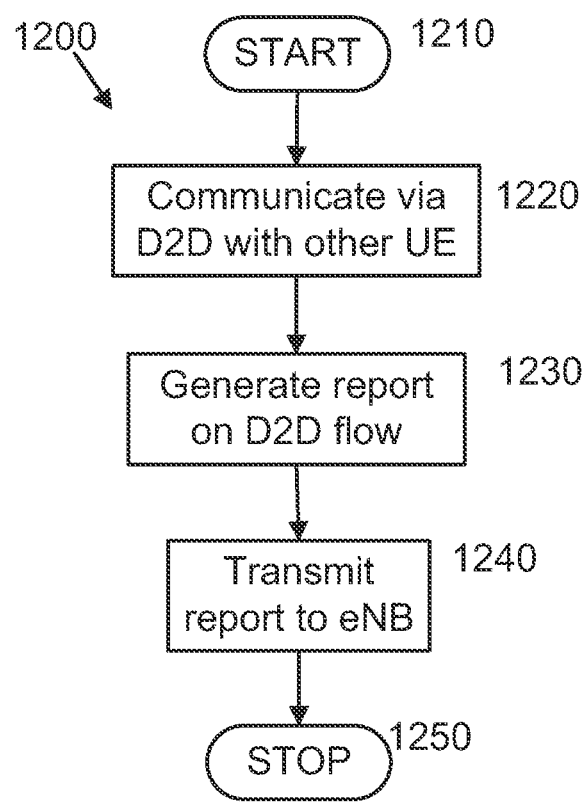
FIG. 12 is a flow-chart illustrating a method performed by a mobile device, according to various embodiments.

FIG. 12 illustrates a method 1200 performed by a UE according to some embodiments. In some embodiments, the UE may be UE0 220 of FIG. 10. The method begins at 1210. At 1220, the UE communicates directly with another D2D-UE by D2D communication. At 1230 the UE generates a report on the D2D flow, including traffic volume information, for example, indicating the volume of data transmitted to and/or received from the other UE (or possibly each of a plurality of UEs for D2D communication involving more than two UEs) by D2D communication. If a data volume report has been sent previously by the UE during this D2D session, the data volume report may include only information relating to data transferred since the last data volume report. At 1240 the report generated at 1230 is transmitted to the eNB 215 (e.g. as in step 8 of FIG. 10).

Figure 13:
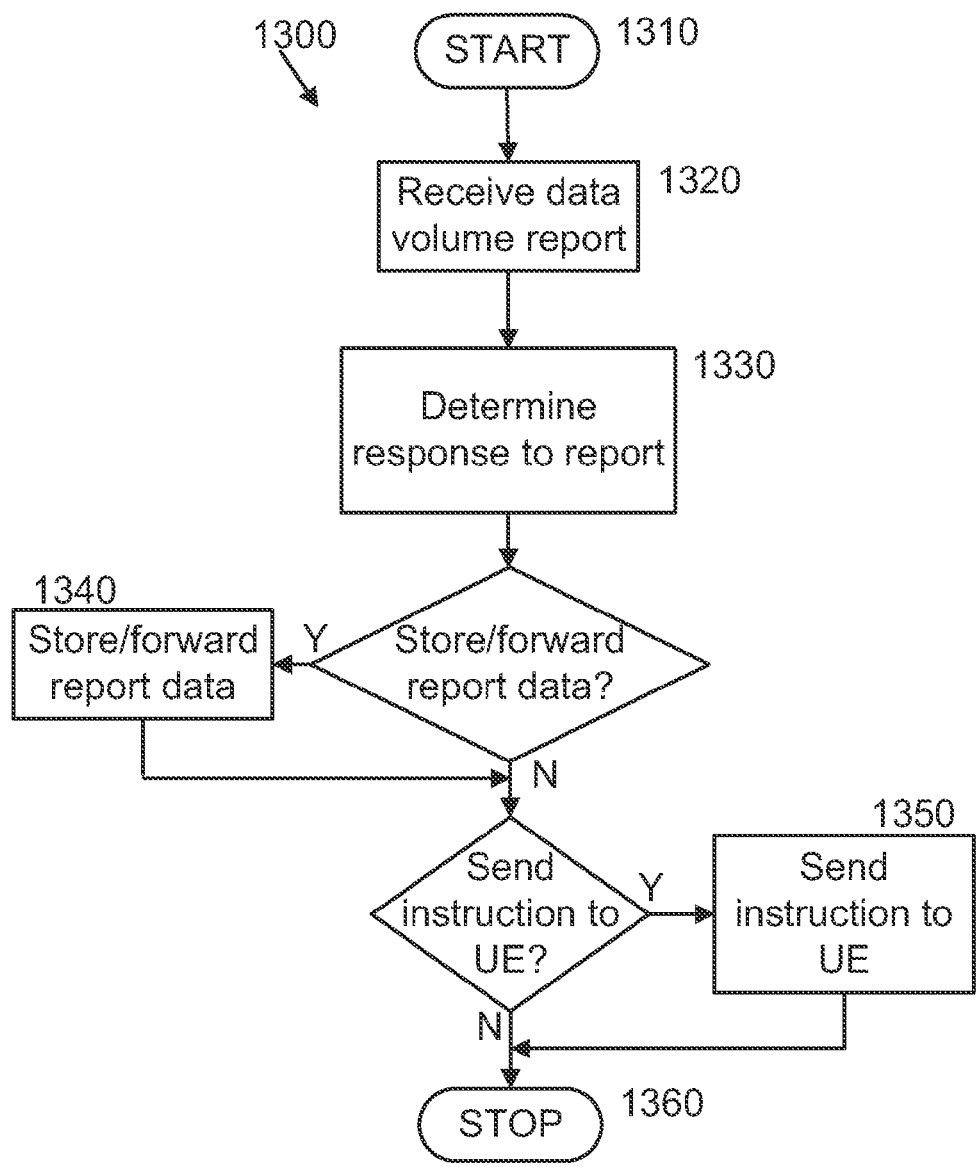
FIG. 13 is a flow-chart illustrating a method performed by a base station, according to various embodiments.

FIG. 13 illustrates a method 1300 performed by an eNB 215 according to some embodiments. The method begins at 1310. At 1320, the eNB 215 receives a data volume report from a UE 220; the data volume report relating to an ongoing D2D session with at least one other UE 222. In some embodiments, the data volume report may be in response to a request sent by the eNB 215 to the UE 220 before the start 1310 of the method of FIG. 13.

The eNB 215 determines, at 1330, one or more actions to perform in response to the report. In some embodiments, the determination at 1330 may depend on the contents of the report. In some embodiments, the determined response to the report may include at least one of storing data, forwarding data to another network element, or sending an instruction to the UE. If it is determined that the report data is to be stored or forwarded, the data is stored or forwarded at 1340. If it is determined that an instruction is to be sent to the UE, the instruction is sent at 1350. Other actions may also be performed by the eNB 215 in response to receiving the report, for example, update billing/charging information related to concerned D2D-UEs, update resource inventory of the eNB/network (e.g., used/available frequency resources), update loading condition information for the network/eNB etc. The method then terminates at 1360.

In various embodiments herein, processing or actions have been described as being performed by an eNB 215. However, it is to be understood that this processing or these actions may, in some cases, be performed by other network elements, such as elements of the core network.

Figure 14:
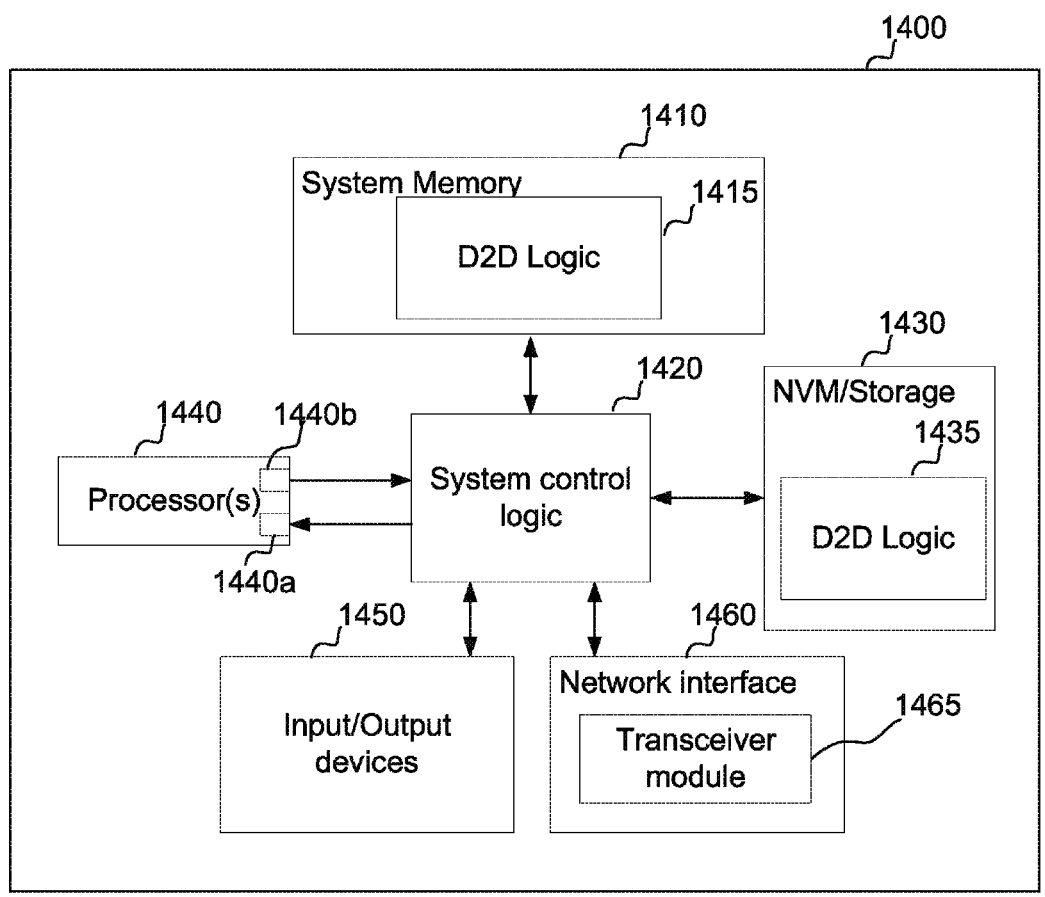
FIG. 14 schematically depicts an example system in accordance with various embodiments.

The eNB 215 and UEs 200, 222 described herein may be implemented using any suitable hardware and/or software. FIG. 14 illustrates an example system 1400 according to some embodiments. System 1400 includes one or more processor(s) 1440, system control logic 1420 coupled with at least one of the processor(s) 1440, system memory 1410 coupled with system control logic 1420, non-volatile memory (NVM)/storage 1430 coupled with system control logic 1420, and a network interface 1460 coupled with system control logic 1420. The system control logic 1420 may also be coupled to Input/Output devices 1450.

Processor(s) 1440 may include one or more single-core or multi-core processors. Processor(s) 1440 may include any combination of general-purpose processors and dedicated processors (e.g., graphics processors, application processors, baseband processors, etc.). Processors 1440 may be operable to carry out the above described methods, using suitable instructions or programs (i.e. operate via use of processor, or other logic, instructions). The instructions may be stored in system memory 1410, as system memory portion (D2D logic) 1415, or additionally or alternatively may be stored in (NVM)/storage 1430, as NVM instruction portion (D2D logic) 1435. D2D logic 1415 and/or 1435 may include a reporting logic to cause a processor 1440 to generate a report on an ongoing D2D session. D2D logic 1415 and/or 1435 may form part of a communication section, including logic to cause transmission of a report on an ongoing D2D session.

Processors(s) 1440 may be configured to execute the embodiments of FIGS. 2-10 in accordance with various embodiments.

System control logic 1420 for one embodiment may include any suitable interface controllers to provide for any suitable interface to at least one of the processor(s) 1440 and/or to any suitable device or component in communication with system control logic 1420.

System control logic 1420 for one embodiment may include one or more memory controller(s) to provide an interface to system memory 1410. System memory 1410 may be used to load and store data and/or instructions, for example, for system 1400. System memory 1410 for one embodiment may include any suitable volatile memory, such as suitable dynamic random access memory (DRAM), for example.

NVM/storage 1430 may include one or more tangible, non-transitory computer-readable media used to store data and/or instructions, for example. NVM/storage 1430 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1430 may include a storage resource physically part of a device on which the system 1400 is installed or it may be accessible by, but not necessarily a part of, the device. For example, the NVM/storage 1430 may be accessed over a network via the network interface 1460.

System memory 1410 and NVM/storage 1430 may respectively include, in particular, temporal and persistent copies of, for example, the instructions portions 1415 and 1435, respectively. Instructions portions 1415 and 1435 may include instructions that when executed by at least one of the processor(s) 1440 result in the system 1400 implementing a one or more of methods 800, 900, 1200 and/or 1300, or the method(s) of any other embodiment, as described herein. In some embodiments, instructions 1415 and 1435, or hardware, firmware, and/or software components thereof, may additionally/alternatively be located in the system control logic 1420, the network interface 1460, and/or the processor(s) 1440.

Network interface 1460 may have a transceiver module 1465 to provide a radio interface for system 1400 to communicate over one or more network(s) (e.g. wireless communication network) and/or with any other suitable device. The transceiver 1465 may perform the various communicating, transmitting and receiving described in the various embodiments, and may include a transmitter section and a receiver section. In various embodiments, the transceiver 1465 may be integrated with other components of system 1400. For example, the transceiver 1465 may include a processor of the processor(s) 1440, memory of the system memory 1410, and NVM/Storage of NVM/Storage 1430. Network interface 1460 may include any suitable hardware and/or firmware. Network interface 1460 may be operatively coupled to a plurality of antennas to provide a multiple input, multiple output radio interface. Network interface 1460 for one embodiment may include, for example, a network adapter, a wireless network adapter, a telephone modem, and/or a wireless modem. For example, where system 1400 is an eNB, network interface 1460 may include an Ethernet interface, an S1-MME interface and/or an S1-U interface. For one embodiment, at least one of the processor(s) 1440 may be packaged together with logic for one or more controller(s) of system control logic 1420. For one embodiment, at least one of the processor(s) 1440 may be packaged together with logic for one or more controllers of system control logic 1420 to form a System in Package (SiP). For one embodiment, at least one of the processor(s) 1440 may be integrated on the same die with logic for one or more controller(s) of system control logic 1420. For one embodiment, at least one of the processor(s) 1440 may be integrated on the same die with logic for one or more controller(s) of system control logic 1420 to form a System on Chip (SoC). Each of the processors 1440 may include an input 1440a for receiving data and an output 1440b for outputting data.

In various embodiments, the I/O devices 1450 may include user interfaces designed to enable user interaction with the system 1400, peripheral component interfaces designed to enable peripheral component interaction with the system 1400, and/or sensors designed to determine environmental conditions and/or location information related to the system 1400.

Figure 15:
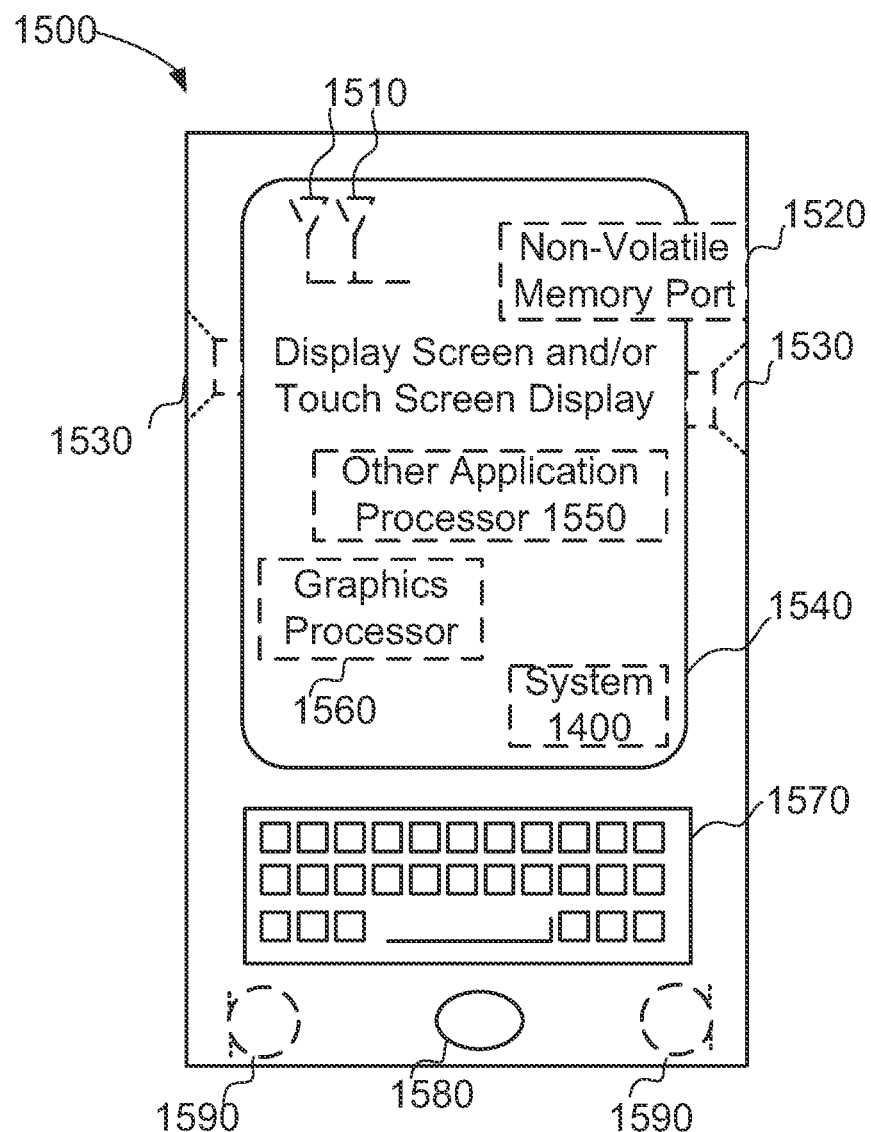
FIG. 15 schematically depicts an example mobile device/User Equipment in accordance with various embodiments.

FIG. 15 shows an embodiment in which the system 1400 implements a UE 220 in the specific form of a mobile device 1500.

In various embodiments, the user interfaces could include, but are not limited to, a display 1540 (e.g., a liquid crystal display, a touch screen display, etc.), a speaker 1530, a microphone 1590, one or more cameras 1580 (e.g., a still camera and/or a video camera), a flashlight (e.g., a light emitting diode flash), and a keyboard 1570.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1460 to communicate with components of a positioning network, e.g., a global positioning system (GPS) satellite.

In various embodiments, the system 1500 may be a mobile computing device such as, but not limited to, a laptop computing device, a tablet computing device, a netbook, a mobile phone, etc. In various embodiments, system 1500 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

One the skilled in the art understands that a "processing circuitry configured to" perform a function comprises at least one of "hardware configured to", "software configured to" and a "combination of hardware and software configured to" perform that function.

Although embodiments of the invention are not limited in this regard, the terms "plurality" and "a plurality" as used herein may include, for example, "multiple" or "two or more." The terms "plurality" or "a plurality" may be used herein to describe two or more components, devices, elements, units, parameters, and the like. For example, "a plurality of devices" may include two or more devices.

Where operations are described as multiple discrete operations, this is for the purpose of explaining the illustrative embodiments; however, the order of description should not be construed as to imply that these operations are necessarily order dependent. In particular, these operations need not be performed in the order of presentation.

The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather only by the scope of the appended claims and their legal equivalents.

Various embodiments can be realized according to the following clauses:

Clause 1. An apparatus for use in a device-to-device, D2D, communication enabled user equipment, UE, comprising:
  a receiver section to receive a signal from another UE;
  a processing section to determine, based on the received signal, a channel condition between the UE and the another UE; and
  a transmitter section to report the determined channel condition to an evolved Node B, eNB, wherein
  the processing section is to initiate D2D communication based on a communication from the eNB, received in response to the report of the determined channel condition.

Clause 2. The apparatus of clause 1, wherein the receiver section is to receive respective signals from a plurality of other UEs, and the processing section is to determine a respective channel condition between the UE and each of the plurality of other UEs, and
  the report is to include the determined channel conditions for each of the plurality of UEs.

Clause 3. The apparatus of clause 2, wherein the report includes a channel condition for a UE that is not a candidate for inclusion in the D2D communication.

Clause 4. The apparatus of any one of clauses 1 to 3, wherein the channel condition is an integer valued variable derived from a measurement of the channel according to a predetermined mapping.

Clause 5. The apparatus of any one of clauses 1 to 4, wherein the transmitter section is to use an Uplink Dedicated Control Channel, UL-DCCH, to transmit the report to the eNB.

Clause 6. The apparatus of any one of clauses 1 to 5, wherein the receiver section is configured to receive the communication from the eNB using Radio Resource Control, RRC, signaling or dynamic Physical Downlink Control Channel, PDCCH.

Clause 7. A user equipment comprising the apparatus of any one of clauses 1 to 6, and further comprising one or more of: a screen, a speaker, a touchscreen, a keyboard, an antenna array including a plurality of antennas, a graphics processor, or an application processor.

Clause 8. A method of initiating device-to-device, D2D, communication between a plurality of user equipments UEs, the plurality of UEs forming a cluster, the method comprising:
  determining, by the a first UE, a channel condition, the channel condition associated with a signal received from a second UE, where the first UE and second UE are in the cluster;

reporting the determined channel condition to an evolved Node B, eNB, and
receiving a result of a determination to enable D2D communication in response to the report of the determined channel condition.

Clause 9. The method of clause 8, wherein the reporting includes sending a report of the determined channel condition using the Uplink Dedicated Control Channel, UL-DCCH.

Clause 10. The method of clause 8 or clause 9, wherein the receiving includes receiving the result of the determination using Radio Resource Control, RRC, signaling or dynamic Physical Downlink Control Channel, PDCCH.

Clause 11. The method of any one of clauses 8 to 10, further comprising:
repeating the determining for respective channel conditions associated with respective signals received from a set of other UEs, wherein
the reporting includes reporting the determined channel conditions for each of the UEs in the set of UEs.

Clause 12. The method of clause 11, wherein at least one of the UEs in the set of UEs are not in the cluster.

Clause 13. The method of any one of clauses 8 to 12, wherein the channel condition is a quantization of a measured value indicative of the channel condition.

Clause 14. An apparatus for use in a network element, the apparatus comprising:
An input to receive a report generated by a first UE, the report describing a channel condition between the first UE and a second UE;
a processor to determine, based on the channel condition between the first UE and the second UE, whether or not D2D communication between the first UE and the second UE is to be enabled; and
an output to output a result of the determination at least when the processor determines D2D communication is to be enabled.

Clause 15. The apparatus of clause 14, further comprising a transmitter to send resource allocation information to at least one of the first UE and the second UE, when the processor determines D2D communication is to be enabled.

Clause 16. The apparatus of clause 14 or clause 15, further comprising a receiver arranged to receive the report from the first UE using an Uplink Dedicated Control Channel, UL-DCCH.

Clause 17. The apparatus of any one of clauses 14 to 16, wherein the report from the first UE describes respective channel conditions between the first UE and a plurality of second UEs.

Clause 18. The apparatus of clause 17, wherein at least one of the plurality of second UEs are not candidates for participation in the D2D communication.

Clause 19. The apparatus of clause 18, wherein the determination whether or not D2D communication is to be enabled is based on likely interference with communication of the at least one second UE that is not a candidate for D2D communication due to enabling of the D2D communication.

Clause 20. The apparatus of any one of clauses 14 to 19, wherein the report describes the channel condition as a quantized value associated with a measured quantity according to a predetermined mapping.

Clause 21. The apparatus of any one of clauses 14 to 20, wherein the processor is to determine whether or not D2D communication is to be enabled based on an expected or required Quality of Service, QoS, and/or an expected or required Quality of Experience, QoE for the D2D communication.

Clause 22. The apparatus of any one of clauses 14 to 21, wherein the network element is a component of a network, and the processor is to determine whether or not D2D communication is to be enabled based on a loading condition of the network.

Clause 23. An evolved Node N, eNB, comprising the apparatus of any one of clauses 14 to 22, and further comprising at least one of an S1-MME interface, an S1-U interface, or an Ethernet connection for communication with a core network.

Clause 24. A method of initiating device-to-device, D2D, communication between a plurality of UEs forming a cluster, the method comprising:
receiving at an evolved node B, eNB, a report from a first UE, the report describing a channel condition between the first UE and a second UE, the first UE and second UE in the cluster of UEs;
determining, based on the report, whether or not D2D communication between the first UE and the second UE is to be enabled; and
if D2D communication is to be enabled, informing at least one of the first UE and the second UE that 2D2 communication is to be enabled.

Clause 25. The method of clause 24, wherein the report describes a channel condition between the first UE and another UE, the another UE different from the second UE.

Clause 26. The method of clause 25, wherein the cluster of UEs does not include the another UE.

Clause 27. An apparatus for use in a device-to-device, D2D, communication enabled user equipment, UE, comprising:
a communication section to control direct communication with another D2D-enabled UE; and
a report section to generate, during a direct communication session with the another UE, a report relating to the communication with the another UE, the report to include a data volume of the communication with the another UE, wherein
the communication section is arranged to cause transmission of the report to an evolved Node B, eNB, while the direct communication session is ongoing.

Clause 28. The apparatus of clause 27, wherein the communication section is arranged to cause transmission of the report to the eNB using RRC signaling.

Clause 29. The apparatus of clause 27 or clause 28, wherein the report is included within a Measurement Result information element.

Clause 30. A User Equipment, UE, comprising the apparatus of any one of clauses 27 to 29, and further comprising one or more of: a screen, a speaker, a touchscreen, a keyboard, an antenna array including a plurality of antennas, a graphics processor, or an application processor.

Clause 31. A method of device-to-device, D2D, communication, comprising:
communicating, by a first user equipment, UE, directly with a second UE in a direct communication session;
determining, by the first UE, that reporting criteria have been met;
generating, in response to the determining, by the first UE during the direct communication session with the second UE, a report relating to the communication with the second UE, the report including a data volume associated with the communication session; and transmitting the report to an evolved Node B, eNB.

Clause 32. The method of clause 31, wherein the transmitting includes transmitting the report to the eNB using RRC signaling.

Clause 33. The method of clause 31 or clause 32, wherein the report is included within a Measurement Results information element.

Clause 34. An apparatus for use in an evolved Node B, eNB, comprising:
 a receiver, to receive a report from a first UE, the report describing a data volume associated with an ongoing direct communication session between the first UE and a second UE;
 a processing section to cause the eNB to respond to the receipt of the report by at least one of storing data from the report, forwarding data from the report to another network element, or sending an instruction to the first UE based on the report; and
 a transmitter to send the instruction to the UE, and
 a storage section to store the data from the report.

Clause 35. The apparatus of clause 34, wherein the receiver is arranged to receive the report from the first UE using RRC signaling.

Clause 36. An evolved Node B, eNB, comprising the apparatus of clause 34 or clause 35, further comprising at least one of an S1-MME interface, an S1-U interface, or an Ethernet connection for communication with a core network.

Clause 37. A method of monitoring device-to-device, D2D, communication, comprising:
 receiving at an evolved Node B, eNB, a report from a first UE, the report describing an ongoing direct communication session between the first UE and a second UE;
 extracting from the report a data volume associated with the direct communication session between the first UE and a second UE, and
 responding to the report by at least one of storing data from the report or sending an instruction to the first UE based on the report.

Clause 38. The method of clause 37, wherein the receiving includes receiving the report from the first UE using RRC signaling.

Clause 39. A device-to-device, D2D, communication enabled user equipment, UE, comprising:
 means for determining a channel condition, the channel condition associated with a signal received from a second UE, where the first UE and second UE are members of a D2D cluster of UEs;
 means for reporting the determined channel condition to an evolved Node B, eNB, and
 means for receiving a result of a determination to enable D2D communication in response to the report of the determined channel condition.

Clause 40. The UE of clause 39, wherein the means for receiving is configured to receive the communication from the eNB using Radio Resource Control, RRC, signaling or dynamic Physical Downlink Control Channel, PDCCH.

Clause 41. A network element comprising:
 means for receiving a report generated by a first user equipment, UE, the report describing a channel condition between the first UE and a second UE, the first UE and second UE in a cluster of UEs;
 means for determining, based on the report, whether or not D2D communication between the first UE and the second UE is to be enabled; and
 means for informing at least one of the first UE and the second UE that D2D communication is to be enabled.

Clause 42. The network element of clause 41, wherein the network element is an evolved Node B, eNB.

Clause 43. A device-to-device, D2D, communication enabled user equipment, UE, comprising:
 means for communicating, by a first user equipment, UE, directly with a second UE in a direct communication session;
 means for determining that reporting criteria have been met;
 means for generating, in response to the determining, the direct communication session with the second UE, a report relating to the communication with the second UE, the report including a data volume associated with the communication session; and
 means for transmitting the report to an evolved Node B, eNB.

Clause 44. The UE of clause 43, wherein the means for communication is arranged to cause transmission of the report to the eNB using RRC signaling.

Clause 45. An evolved Node B, eNB, comprising:
 means for receiving a report from a first UE, the report describing an ongoing direct communication session between the first UE and a second UE;
 means for extracting from the report a data volume associated with the direct communication session between the first UE and a second UE, and
 means for responding to the report by at least one of storing data from the report, forwarding data from the report to another network element, or sending an instruction to the first UE based on the report.

Clause 46. The eNB of clause 45, wherein the means for receiving is arranged to receive the report from the first UE using RRC signaling.

Clause 47. A non-transitory machine-readable storage medium having stored thereon instructions that, when executed by a computer, cause the computer to perform the method of any one of clauses 8 to 13, 24 to 26, 31 to 33, 37 or 38, or operate as the device of any one of clauses 1 to 7, 14 to 23, 27 to 30, 34 to 36, or 39 to 46.

Clause 48. A User Equipment, UE, substantially as described herein with reference to the drawings.

Clause 49. An evolved Node B, eNB, substantially as described herein with reference to the drawings.

Clause 50. A method substantially as described herein with reference to the drawings.

The invention claimed is:

1. An apparatus for use in a device-to-device, D2D, communication enabled user equipment, UE, comprising:
 a receiver to receive a signal from another UE;
 a processor to determine, based on the received signal, a channel condition between the UE and the another UE, and to generate a dedicated information element (IE) that includes a plurality of integer values, the plurality of integer values to include a first integer value that corresponds to the channel condition, wherein the plurality is a number that is equal to or less than a predetermined limit of UEs with which the UE is to be connected in a D2D group; and
 a transmitter to send the dedicated IE to report the determined channel condition to an evolved Node B, eNB, wherein the processor is to initiate D2D communication based on a communication from the eNB, received in response to the report of the determined channel condition.

2. The apparatus of claim 1, wherein the receiver is to receive respective signals from a plurality of other UEs, and the processor is to determine a respective channel condition between the UE and each of the plurality of other UEs, and the report is to include the determined channel conditions for the each of the plurality of other UEs, wherein the determined channel conditions are each indicated by a respective one of remaining integer values of the plurality of integer values included in the dedicated IE sent by the transmitter.

3. The apparatus of claim 2, wherein one UE of the plurality of other UEs is not a candidate for inclusion in the D2D communication.

4. The apparatus of claim 1, wherein the first integer value is to correspond to the channel condition based on a predetermined mapping.

5. The apparatus of claim 1, wherein the transmitter is to use an Uplink Dedicated Control Channel, UL-DCCH, to transmit the report to the eNB.

6. The apparatus of claim 1, wherein the receiver is to receive the communication from the eNB using Radio Resource Control, RRC, signalling or dynamic Physical Downlink Control Channel, PDCCH.

7. The apparatus of claim 1, wherein the transmitter is further to report information on a volume of data transferred between the UE and the another UE via the D2D communication after the D2D communication is initiated.

8. A user equipment comprising the apparatus of claim 1, and further comprising one or more of: a screen, a speaker, a touchscreen, a keyboard, an antenna array including a plurality of antennas, a graphics processor, or an application processor.

9. A method of initiating device-to-device, D2D, communication between a plurality of user equipments UEs, the plurality of UEs forming a cluster, the method comprising:
determining, by a first UE, a channel condition, the channel condition associated with a signal received from a second UE, where the first UE and second UE are in the cluster;
reporting the determined channel condition to an evolved Node B, eNB, using a dedicated information element (IE) that includes a plurality of integer values, the plurality of integer values to include a first integer value that corresponds to the channel condition, wherein the plurality is a number that is equal to or less than a predetermined limit of UEs with which the first UE is to be connected in a D2D group; and
receiving a result of a determination to enable D2D communication in response to the report of the determined channel condition.

10. The method of claim 9, further comprising:
repeating the determining for respective channel conditions associated with respective signals received from remaining UEs of the plurality of UEs, wherein the reporting includes reporting the determined channel conditions for the remaining UEs of the plurality of UEs using respective ones of remaining integer values of the plurality of integer values included in the dedicated IE.

11. The method of claim 10, further comprising:
determining a channel condition associated with at least one UE not in the cluster; and
reporting the determined channel condition associated with the at least one UE to the eNB, using a remaining integer value of the plurality of integer values included in the dedicated IE.

12. The method of claim 9, wherein the first integer value is a quantization of a measured value indicative of the channel condition.

13. The method of claim 9, further comprising reporting, after the D2D communication is enabled, information on a volume of data transferred between the first UE and the second UE via the D2D communication.

14. An apparatus for use in a network element, the apparatus comprising:
an input to receive a report generated by a first UE, the report describing a channel condition between the first UE and a second UE using a dedicated information element (IE) that includes a plurality of integer values, the plurality of integer values to include a first integer value that corresponds to the channel condition, wherein the plurality is a number that is equal to or less than a predetermined limit of UEs with which the first UE is to be connected in a device-to-device, D2D, communication;
a processor to determine, based on the channel condition between the first UE and the second UE, whether or not D2D communication between the first UE and the second UE is to be enabled; and
an output to output a result of the determination at least when the processor determines D2D communication is to be enabled.

15. The apparatus of claim 14, further comprising a transmitter to send resource allocation information to at least one of the first UE and the second UE, when the processor determines D2D communication is to be enabled.

16. The apparatus of claim 14, wherein the report from the first UE describes respective channel conditions between the first UE and a plurality of second UEs using respective ones of remaining integer values of the plurality of integer values included in the dedicated IE.

17. The apparatus of claim 16, wherein at least one of the plurality of second UEs are not candidates for participation in the D2D communication.

18. The apparatus of claim 17, wherein the determination whether or not D2D communication is to be enabled is based on likely interference, due to enabling of the D2D communication, with communication of the at least one second UE that is not a candidate for D2D communication.

19. The apparatus of claim 14, wherein the processor is to determine whether or not D2D communication is to be enabled based on an expected or required Quality of Service, QoS, and/or an expected or required Quality of Experience, QoE for the D2D communication.

20. The apparatus of claim 14, wherein the network element is a component of a network, and the processor is to determine whether or not D2D communication is to be enabled based on a loading condition of the network.

21. The apparatus of claim 14, wherein the input further receives a report including information on a volume of data transferred between the first UE and the second UE via the D2D communication after the D2D communication is enabled.

22. An evolved Node B, eNB, comprising the apparatus of claim 14, and further comprising at least one of an S1-MME interface, an S1-U interface, or an Ethernet connection for communication with a core network.

23. A non-transient machine-readable storage medium having stored thereon instructions that, when executed by a computer, cause the computer to initiate device-to-device, D2D, communication between a plurality of user equipments UEs, the plurality of UEs forming a cluster, the instructions to cause the computer to:
- determine, by a first UE, a channel condition, the channel condition associated with a signal received from a second UE, where the first UE and second UE are in the cluster;
- report the determined channel condition to an evolved Node B, eNB, using a dedicated information element (IE) that includes a plurality of integer values, the plurality of integer values to include a first integer value that corresponds to the channel condition, wherein the plurality is a number that is equal to or less than a predetermined limit of UEs with which the first UE is to be connected in a D2D group; and
- receive a result of a determination to enable D2D communication in response to the report of the determined channel condition.

* * * * *